(12) United States Patent
Tobata et al.

(10) Patent No.: US 10,562,421 B2
(45) Date of Patent: Feb. 18, 2020

(54) VEHICULAR SEAT

(71) Applicant: TACHI-S CO., LTD., Akishima-shi, Tokyo (JP)

(72) Inventors: Hideo Tobata, Tokyo (JP); Naoyuki Makita, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/518,726

(22) PCT Filed: Nov. 4, 2015

(86) PCT No.: PCT/JP2015/081037
§ 371 (c)(1),
(2) Date: Apr. 12, 2017

(87) PCT Pub. No.: WO2016/072419
PCT Pub. Date: May 12, 2016

(65) Prior Publication Data
US 2017/0217345 A1    Aug. 3, 2017

(30) Foreign Application Priority Data
Nov. 7, 2014    (JP) .................................. 2014-227150

(51) Int. Cl.
*B60N 2/58*    (2006.01)
(52) U.S. Cl.
CPC .................................. *B60N 2/5825* (2013.01)
(58) Field of Classification Search
CPC ........ B60N 2/58; B60N 2/5825; A47C 31/023
USPC .................................. 297/218.1, 218.2, 218.5
See application file for complete search history.

(56) References Cited

U.S. PATENT DOCUMENTS

| 4,715,651 | A | * | 12/1987 | Wakamatsu | ......... | B60N 2/5825 |
| | | | | | | 297/218.1 |
| 4,789,201 | A | * | 12/1988 | Selbert | ................. | B60N 2/5825 |
| | | | | | | 297/218.1 |
| 4,867,507 | A | * | 9/1989 | Arai | ..................... | B60N 2/5883 |
| | | | | | | 297/218.1 |

(Continued)

FOREIGN PATENT DOCUMENTS

| JP | S57-102352 U | 6/1982 |
| JP | S60-017199 U | 2/1985 |

(Continued)

OTHER PUBLICATIONS

International Search Report from International Patent Application No. PCT/JP2015/081037, dated Jan. 26, 2016.

*Primary Examiner* — Rodney B White
(74) *Attorney, Agent, or Firm* — SGPatents PLLC

(57) ABSTRACT

With respect to a vehicular seat, a hook member of a seat skin and a seat frame structure that facilitate assembling of the skin of a seat cushion or a seat back to a seat frame are provided. The vehicular seat includes: a seat cushion to be a seating face portion of the seat; and a seat back provided on the rear side of the seat cushion and to be a backrest portion of the seat. At least either of the seat cushion and the seat back includes an engaging member provided at an end of the skin material thereof with one or more protruded portions. The skin material is engaged with the seat frame by fitting the protruded portions on the engaging member into grooves or openings provided in the seat frame of the vehicular seat.

4 Claims, 3 Drawing Sheets

(56) References Cited

U.S. PATENT DOCUMENTS

| | | | | |
|---|---|---|---|---|
| 5,518,292 A * | 5/1996 | Cozzani | ............... | A47C 31/023 297/218.1 X |
| 5,826,939 A * | 10/1998 | Beyer | ................ | B60N 2/5825 297/218.1 X |
| 5,882,073 A * | 3/1999 | Burchi | ............... | B29C 44/1257 297/218.2 |
| 6,283,552 B1 * | 9/2001 | Halse | ............... | B60N 2/7005 297/218.1 |
| 6,406,093 B1 * | 6/2002 | Miotto | ................ | B60N 2/5825 297/218.3 |
| 7,568,761 B2 * | 8/2009 | Mashimo | ............. | B60N 2/5825 297/218.1 |
| 7,901,002 B2 * | 3/2011 | Mashimo | ............. | B60N 2/5825 297/218.3 |
| 8,926,013 B2 * | 1/2015 | Kurashita | ............ | B60N 2/7011 297/218.5 X |
| 2003/0151280 A1 * | 8/2003 | Hashiguchi | .......... | B60N 2/5825 297/218.1 |
| 2003/0184136 A1 * | 10/2003 | Moilanen | ............ | B60N 2/5825 297/218.2 |
| 2005/0184565 A1 * | 8/2005 | Weiss | ................... | B60N 2/5635 297/180.15 |
| 2007/0257531 A1 * | 11/2007 | Mashimo | ............. | B60N 2/5825 297/218.3 |
| 2009/0121528 A1 * | 5/2009 | Oku | ..................... | B60N 2/5825 297/218.5 |
| 2010/0259079 A1 * | 10/2010 | Matsuzaki | ........... | B60N 2/5816 297/218.2 |
| 2011/0049948 A1 * | 3/2011 | Hobl | ................... | B60N 2/5825 297/218.2 |
| 2013/0257119 A1 * | 10/2013 | Roberts | ................. | B60N 2/427 297/216.13 |
| 2014/0237777 A1 * | 8/2014 | Braggion | ........... | B60R 13/0206 24/297 |
| 2015/0197172 A1 * | 7/2015 | Durnil | ................. | B60N 2/6063 297/183.6 |

FOREIGN PATENT DOCUMENTS

| | | |
|---|---|---|
| JP | S61-196697 U | 12/1986 |
| JP | H06-013695 U | 2/1994 |
| JP | H09-020164 A | 1/1997 |
| JP | 2008-253336 A | 10/2008 |
| JP | 2010-005104 A | 1/2010 |
| JP | 5345761 B2 | 11/2013 |

* cited by examiner

VEHICULAR SEAT

TECHNICAL FIELD

The present invention relates to a vehicular seat and a method for manufacturing the same.

BACKGROUND ART

In such vehicular seats as automobile seats, a seat skin and a metal plate, that is, a seat frame are assembled together by hooking a resin hook sewed on the seat skin on the seat frame.

Seat skins are roughly classified into two types: cloths designated as fabric and leathers depending on their material. There are two types of fabric: knitting and textile stuff and leathers include genuine leathers, synthetic leathers, and the like.

An example of the background arts in the present technical field is found in Japanese Patent Application Laid-Open No. 2008-253336 (Patent Literature 1). Patent Literature 1 discloses a headrest that can be brought into a head support state in which the headrest is raised from a backrest seat and a retracted state in which the headrest is tilted from the head support state. The headrest includes: a supporting member attached to the upper part of the backrest seat and having at least leg portions; front and rear cover members provided with insertion portions into which the leg portions of the supporting member are inserted and configured to sandwich the supporting member therebetween; a skin material formed in a pouch shape so as to cover the front and rear cover members; right and left skin retaining cover members fit into the insertion portions of the front and rear cover members so as to sandwich the skin material positioned in the vicinity of the insertion portions; and a pad material molded integrally with the skin material and the front and rear cover members using resin foam injected into between the skin material and the front and rear cover members. An opening communicating to the right and left insertion portions is formed in the front and rear cover members and an end of the skin material positioned in the opening is squeezed into the opening.

Patent Literature 1 claims that this headrest can prevent an end of the skin of the headrest from coming off.

Japanese Patent No. 5345761 (Patent Literature 2) discloses a headrest that can be brought into a head support state in which the headrest is raised from a backrest seat and a retracted state in which the headrest is tilted form the head support state. The headrest includes: a supporting member attached to the upper part of the backrest seat and having at least leg portions; front and rear cover members provided with insertion portions into which the leg portions of the supporting member are inserted and configured to sandwich the supporting member therebetween; a skin material formed in a pouch shape so as to cover the front and rear cover members; a skin retaining cover member that closes the insertion portions of the front and rear cover members and sandwiches the end of the skin material on the opening side; and a pad material molded integrally with the skin material and the front and rear cover members using resin foam injected into between the skin material and the front and rear cover members. The skin retaining cover member includes: a substantially plate-like body portion; cylindrical portions into which the leg portions of the supporting member are inserted; and a plurality of engaging pawls formed in the cylindrical portions. The end of the skin material is sandwiched between the bottom faces of the front and rear cover members and the upper face of the body portion of the skin retaining cover member by engaging the engaging pawls with the rims of the insertion portions. At least two cylindrical portions are formed in the skin retaining cover member and a notch is formed in the cylindrical portions on their respective opposite sides.

Patent Literature 2 claims that this headrest makes it possible to simplify the cover structure of the headrest and enhance the efficiency of production work.

CITATION LIST

Patent Literature

PTL 1: Japanese Patent Application Laid-Open No. 2008-253336

PTL 2: Japanese Patent No. 5345761

SUMMARY OF INVENTION

Technical Problem

As mentioned above, in such vehicular seats as automobile seats, a seat skin and a seat frame are assembled together by hooking a resin hook sewed on the seat skin on the seat frame. When the resin hook is hooked on the seat frame, it is necessary to cause a hooking portion of the resin hook to overstride the seat frame before hooking and this work is very difficult to conduct.

Since the resin hook of the seat skin is hard, the hooking portion of the seat frame cannot be formed into a curved shape and must be formed into a straight shape.

In the above work, the resin hook is hooked on an end of the seat frame; therefore, a worker must put his/her fingers into the seat frame and this can injure him/her.

In particular, a seat cushion to be a seating face portion for an occupant and a seat back to be a backrest portion always bear a load from the occupant while the occupant is seated. To cope with this, a tension must be given to the seat skin and this makes difficult the above-mentioned seat skin assembling work.

As mentioned above, fabric or leather is used for seat skins. Leather is inferior in expandability and this makes seat skin assembling work more difficult.

Patent Literature 1 and Patent Literature 2 relate to headrest covers. It is difficult to maintain a skin tension sufficient to adequately endure a load from an occupant like the above-mentioned seat cushion and seat back.

Consequently, it is an object of the present invention to provide a seat skin hook member and a seat frame structure that facilitate assembly of the skin of a seat cushion or a seat back to a seat frame with respect to vehicular seats.

Solution to Problem

The present invention is a vehicular seat including: a seat cushion to be a seating face portion of the seat; and a seat back provided on the rear side of the seat cushion and to be a backrest portion of the seat. At least either of the seat cushion and the seat back is provided at an end of the skin material thereof with an engaging member having one or more protruded portions. The skin material is engaged with the seat frame by fitting the protruded portion of the engaging member into a groove or an opening formed in the seat frame of the vehicular seat.

Advantageous Effect of Invention

According to the present invention, with respect to a vehicular seat, it is facilitated to assemble the skin of a seat cushion or a seat back to a seat frame.

According to the present invention, with respect to the seat frame of a vehicular seat, it is possible to freely design the shape of the seat frame's portion engaged with a seat skin.

According to the present invention, with respect to a vehicular seat, it is possible to enhance the safety of a worker in work of assembling the skin of a seat cushion or a seat back to a seat frame.

Other problems, configuration elements, and effects than mentioned above will be apparent from the following description of an embodiment.

DESCRIPTION OF EMBODIMENTS

Hereafter, a description will be given to an embodiment of the present invention with reference to the drawings.

First Embodiment

Figure 1:
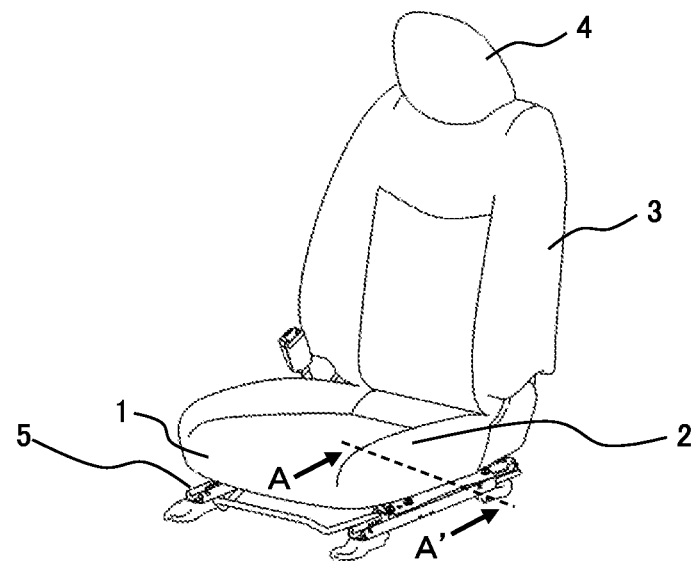
FIG. 1 is a drawing illustrating an overview of a typical vehicular seat.

FIG. 1 illustrates an overview of a typical vehicular seat. As shown in FIG. 1, the vehicular seat mainly includes: a seat cushion 1 to be a seating face portion of the seat; a seat back 3 provided on the rear side of the seat cushion 1 and to be a backrest portion; a headrest 4 protecting the head and neck of an occupant; and the like. On both sides of the seat cushion 1, provided is a side support 2 supporting a side portion of the seating face portion. The seat is attached to a vehicle body via a slide rail 5 and the fore-and-aft position of the seat can be varied relative to the vehicle body.

Figure 2:
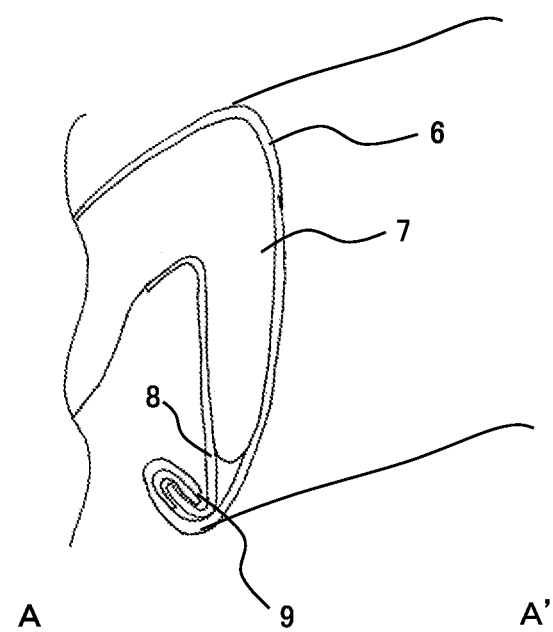
FIG. 2 is a drawing illustrating a seat skin's hook and an end of a seat frame in a conventional vehicular seat.

FIG. 2 is a sectional view of a side portion, that is, a side support 2 of a seat cushion 2 of a conventional vehicular seat. FIG. 2 shows a section taken along line A-A' of FIG. 1.

As illustrated in FIG. 2, a seat frame 8 to be the skeleton of the seat has an end of the seat frame 8 folded back. A seat skin is attached to the seat frame by hooking a resin hook 9 provided at an end of the seat skin, that is, a seat cover (trim cover) 6 on the folded-back end of the seat frame 8.

In conventional vehicular seats, hard resin, such as polyethylene or polypropylene, is used for the resin hook 9.

A cushion pad 7 to be a cushion material for the seat is provided between the seat frame 8 and the seat cover (trim cover) 6. This cushion pad 7 is placed on the seat frame 8 and is so structured as to be covered with the seat cover (trim cover) 6.

In a manufacturing process for the vehicular seat, a resin hook 9 sewed on an end of the seat skin, that is, the seat cover (trim cover) 6 is pulled and hooked on the folded-back end of the seat frame 8. The seat skin and the metal plate, that is, the seat frame 8 are thereby assembled together.

When the seat skin and the seat frame are assembled together, it is necessary to cause the hooking portion of the resin hook 9 to overstride the seat frame 8 before hooking and this work is difficult to conduct.

In cases where the seat skin is leather, such as genuine leather or synthetic leather, the seat skin itself is inferior in expandability and is less prone to expand. This makes the above work more difficult.

Especially, in winter seasons, the temperature is low and the seat skin is difficult to expand. This makes the above work further difficult.

When the above assembling work is conducted, the resin hook 9 is hooked on an end of the seat frame 8. Therefore, a worker must put his/her fingers into the interior (inside) of the seat frame and he/she can be injured, for example, he/she can get cut or caught in the seat frame.

As mentioned above, the resin hook 9 is formed of hard resin; therefore, the hooking portion of the seat frame 8 must be formed into a straight shape and cannot be formed into a curved shape. Thus, designing of the shape of the seat frame is restricted.

Figure 3:
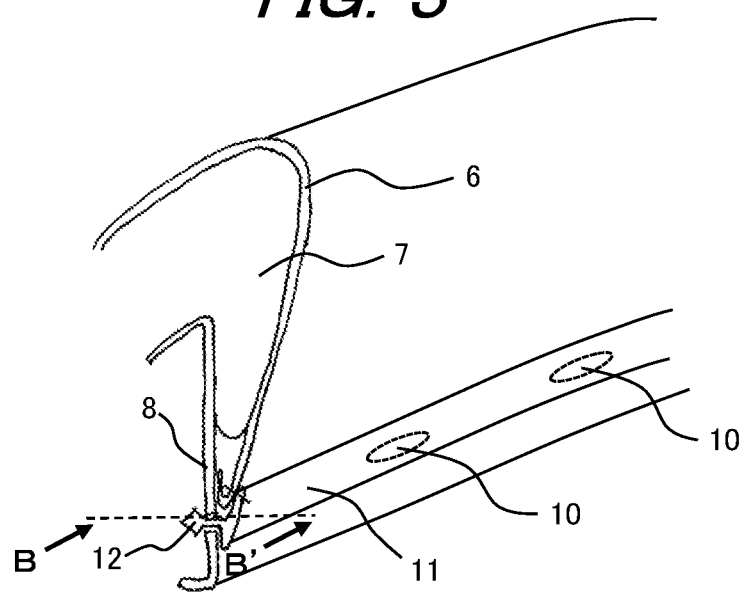
FIG. 3 is a drawing illustrating a seat skin's hook and an end of a seat frame in a vehicular seat in one embodiment of the present invention.

FIG. 3 illustrates the structure of a hook of a seat skin and an end of a seat frame of a vehicular seat in this embodiment. As shown in FIG. 3, in the vehicular seat in this embodiment, the seat skin, that is, the seat cover (trim cover) 6 is provided at an end thereof with a resin hook 11. The resin hook 11 is provided, for example, by sewing it on an end of the seat cover (trim cover) 6.

As shown in FIG. 3, the resin hook 11 is provided with one or more protruded portions 12. The resin hook 11, including a belt-like portion to be a base member and the protruded portions 12, is entirely formed of soft resin. Such elastomer as silicone rubber is used for this soft resin.

The protruded portions 12 provided on the resin hook 11 are fit into openings (holes) 10 provided in the seat frame 8. The openings (holes) 10 in the seat frame 8 are provided in positions corresponding to the protruded portions 12 on the resin hook 11 in the same number as that of the protruded portions 12.

Figure 4A:
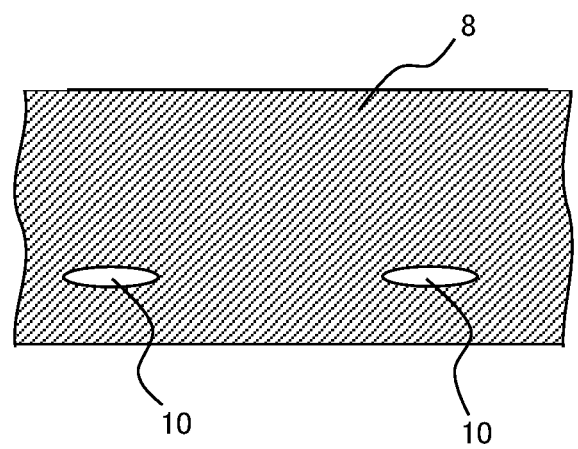
FIG. 4A is a drawing partially illustrating a plane of a seat frame of a vehicular seat in one embodiment of the present invention.

FIG. 4A is a plan view of an end of the seat frame 8. The seat frame 8 is provided with one or more openings (holes) 10, into which the protruded portions 12 on the resin hook 11 provided at an end of the seat skin are fit.

Figure 4B:
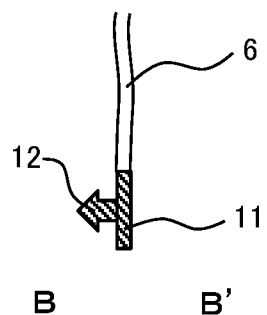
FIG. 4B is a drawing partially illustrating a section of a seat skin's hook of a vehicular seat in one embodiment of the present invention.

FIG. 4B illustrates a section of an end of the seat cover (trim cover) 6 and the resin hook 11 provided at an end of the seat cover (trim cover) 6. FIG. 4B shows a section taken along line B-B' of FIG. 3. The resin hook 11 is provided at an end of the seat cover (trim cover) 6 as the seat skin, for example, by sewing. The resin hook 11 is provided with the protruded portions 12.

In the example in FIG. 3, the protruded portion 12 has a rectangular or rhombic sectional shape but may have an arrow-like sectional shape as shown in FIG. 4B. The shape of the protruded portions 12 must be such that, after the protruded portions 12 are fit into the openings (holes) 10 in the seat frame 8, the protruded portions 12 are difficult to be easily removed from the openings (holes) 10 in the seat frame 8.

As described up to this point, according to the terminal structure of a seat skin's hook and a seat frame in this embodiment, an advantage is brought about when the seat skin and the seat frame are assembled together. Unlike conventional cases, it is unnecessary to cause the hooking portion of the seat skin to overstride the seat frame for hooking and the seat skin can be easily attached to the seat frame by fitting the protruded portions 12 on the resin hook 11 into the openings (holes) 10 in the seat frame 8.

When the above assembling work is conducted, a worker need not put his/her fingers into the interior (inside) of the seat frame and workability and safety can be enhanced.

Since the resin hook 11, including a belt-like portion to be a base member and the protruded portions 12, is entirely formed of soft material, the resin hook 11 can be attached in line with the shape of an end of the seat frame. Therefore, the shape of the seat frame 8 need not be limited to a straight shape and may be in a curved shape, for example, a wavelike shape. That is, the degree of freedom in designing the shape of the seat frame 8 can be enhanced.

In the description of this embodiment, a case where the resin hook 11, including a belt-like portion to be a base member and the protruded portions 12, is entirely formed of soft resin such as silicone rubber is taken as an example. Instead, the belt-like portion to be a base member may be formed of soft resin such as silicone rubber and the protruded portions 12 may be formed of hard resin, such as carbon-fiber-reinforced-plastic (CFRP), polyethylene, or polypropylene.

As a result, not only the resin hook 11 can be attached along the shape of an end of the seat frame. The endurance of the protruded portions 12 is enhanced by forming the protruded portions 12 of hard resin and thus the strength of fit (engagement) between the openings (holes) 10 in the seat frame 8 and the protruded portions 12 can be enhanced.

In the description of this embodiment, a case where the seat frame 8 is provided with the openings (holes) 10 and the protruded portions 12 on the resin hook 11 are fit into the openings (holes) 10 is taken as an example. Instead of openings (holes), grooves having a hooking portion may be provided.

As the result of the hooking portions of the grooves and the protruded portions 12 on the resin hook 11 being hooked together, the seat skin can be easily attached to the seat frame similarly to the case of the openings (holes).

The present invention is not limited to the above-mentioned embodiment and includes various modifications. The above embodiment has been described in detail for making the present invention easily understandable and need not include all the configuration elements described above. A part of the configuration elements of the embodiment may be replaced with a configuration element of another embodiment; and a configuration element of the embodiment may be added to the configuration elements of another embodiment. A different configuration element may be added to or replaced with a part of the configuration elements of each embodiment and a part of the configuration elements of each embodiment may be deleted.

REFERENCE SIGNS LIST

1 - - - Seat cushion,
2 - - - Side support,
3 - - - Seat back,
4 - - - Headrest,
5 - - - Slide rail,
6 - - - Seat cover (trim cover),
7 - - - Cushion pad,
8 - - - Seat frame,
9, 11 - - - Resin hook,
10 - - - Opening (hole),
12 - - - Protruded portion.

The invention claimed is:

1. A vehicular seat comprising:
a seat cushion to be a seating face portion of the seat; and
a seat back provided on a rear side of the seat cushion and to be a backrest portion of the seat,
wherein at least either of the seat cushion and the seat back includes an engaging member provided at an end of a skin material of either of the seat cushion and the seat back with a plurality of protruded portions,
wherein the engaging member is constituted by a silicone rubber member having a belt-shaped base portion and the plurality of protruded portions spaced along a length of the base portion,
wherein the skin material is engaged with a seat frame of the vehicular seat by fitting each of the protruded portions of the engaging member into a groove or opening provided in a curved, generally vertically oriented side surface of the seat frame with the length of base portion substantially following a curved contour of the side surface of the seat frame.

2. A vehicular seat according to claim 1, wherein each of the protruded portions is a one-piece projection with no other projection adjacent thereto in a widthwise direction of the base portion.

3. A vehicular seat according to claim 2, wherein each projection has a free end of rectangular or rhombic cross-sectional shape.

4. A vehicular sea according to claim 2, wherein each projection has a free end of isosceles triangular cross-sectional shape.

* * * * *